(12) United States Patent
Lee

(10) Patent No.: US 6,633,140 B2
(45) Date of Patent: Oct. 14, 2003

(54) DISPLAY APPARATUS WITH A COMBINED STRUCTURE OF ELECTRON GUN AND VIDEO UNIT

(75) Inventor: Wan-Sub Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 50 days.

(21) Appl. No.: 09/996,817

(22) Filed: Nov. 30, 2001

(65) Prior Publication Data

US 2003/0001525 A1 Jan. 2, 2003

(30) Foreign Application Priority Data

Jun. 27, 2001 (KR) ........................................ 2001-37073

(51) Int. Cl.[7] ............................ H05B 41/00; H04N 5/74
(52) U.S. Cl. ........................ 315/363; 348/776; 439/801
(58) Field of Search ........................ 315/363; 348/776, 348/805, 739, 808, 809; 313/397, 461, 476; 439/801

(56) References Cited

U.S. PATENT DOCUMENTS

| | | | |
|---|---|---|---|
| 4,687,966 A | * 8/1987 | Carroll et al. | 313/440 |
| 4,975,618 A | * 12/1990 | Koba et al. | 313/440 |
| 5,350,978 A | * 9/1994 | Chen | 313/440 |
| 5,793,448 A | * 8/1998 | Atkinson et al. | 315/368.15 |
| 5,969,775 A | * 10/1999 | Jeong | 348/819 |

* cited by examiner

Primary Examiner—Don Wong
Assistant Examiner—Thuy Vinh Tran
(74) Attorney, Agent, or Firm—Robert E. Bushnell, Esq.

(57) ABSTRACT

A display apparatus using clamps for coupling an electron gun unit with a video unit is provided. The display apparatus may be constructed using a panel on which a picture is displayed, a funnel fastened to the panel, an electron gun inserted into a neck of the funnel, a video unit coupled with the electron gun for transmitting a video signal, and first and second clamps respectively coupled with the electron gun and the video unit for preventing the video unit from separating from the electron gun. With this configuration, the video unit is easily combined to the electron gun and prevented from separating from the electron gun.

22 Claims, 6 Drawing Sheets

DISPLAY APPARATUS WITH A COMBINED STRUCTURE OF ELECTRON GUN AND VIDEO UNIT

CLAIM OF PRIORITY

This application makes reference to, incorporate the same herein, and claims all benefits accruing under 35 U.S.C. §119 from an application for DISPLAYING APPARATUS earlier filed in the Korean Industrial Property Office on Jun. 27, 2001 and there duly assigned Serial No. 37073/2001 by that Office.

BACKGROUND OF THE INVENTION

1. Field of the Invention

The present invention relates to a display apparatus, and more particularly, to a display apparatus improved in a combination structure of an electron gun and a video unit.

2. Description of the Related Art

A display apparatus collectively refers to monitors for a TV set or a computer system, and includes an LCD (liquid crystal display) monitor, a CRT (cathode ray tube) monitor, and a CDT (color display tube) monitor. Generally, the CDT monitor and the CRT monitor respectively refer to the monitors for the computer system and the TV set, employing a cathode ray tube. Hereinbelow, the CRT monitor will be defined to include the CDT monitor.

A conventional display apparatus for the CRT monitor includes a cathode ray tube formed by combination of a panel and a funnel, an electron gun inserted into a neck of the cathode ray tube, and a video unit combined with the electron gun.

If the electron gun emits the electron beam into the cathode ray tube according to an intensity of the video signal transmitted from the video unit, the electron beam collides with fluorescent materials of monochrome or RGB (red, green, blue) colors coated on an inner surface of the panel, thereby displaying a picture on the panel.

In the conventional display apparatus, the video unit is easily separated from the electron gun. The increasing performance demands for the displaying device have led to the increasing demands for larger and heavier video units.

As a method of fastening the video unit to the electron gun, fastening means such as a cable-tie is used. It is not easy to handle and does not have a sufficient combination force, so that the video unit is likely to easily separate from the electron gun.

In order to strengthen the combing force, the video unit may be directly combined to the neck of the cathode ray tube. In this case, however, the neck made of glass may be broken because of the weight of the video unit.

SUMMARY OF THE INVENTION

Accordingly, it is an object of the present invention to provide an improved display device.

It is another object to provide a display apparatus in which a video unit is easily combined to an electron gun.

It is still another object to provide a display apparatus which has a strong combination force between a video unit and an electron gun.

It is yet another object to provide a display apparatus in which a neck of a cathode ray tube is prevented from being broken.

To achieve these and other objects, a display device may be constructed with a panel on which a picture is displayed, a funnel being combined to the panel, an electron gun being inserted into a neck of the funnel and having a boss exposed outside of the neck, a video unit combined to the electron gun and transmitting a video signal, and first and second clamps respectively mounted on the electron gun and the video unit. The first and second clamps prevent the video unit from separating from the electron gun. The video unit includes a shield having a neck hole through which the electron gun is inserted, a reinforcement member having a plurality of ribs toward the electron gun and being combined to the shield, and a video PCB (printed circuit board) being fastened to the rear of the shield and having a boss holder receiving the boss of the electron gun. The first clamp includes a first clamp main body mounted on the neck of the funnel, and a first tightening member making opposite ends of the fist clamp main body close to each other so as to fasten the first clamp main body on the neck. The second clamp includes a second clamp main body being held by a plurality of ribs of the video unit, and a second tightening member making opposite ends of the second clamp main body close to each other so as to fasten the second clamp main body on the first clamp main body when the second clamp main body is combined to the first clamp main body. Preferably, the first and second clamps are of a ring shape. Preferably, one of the first and second clamp main bodies has at least one hole, and the other of the first and second clamp main bodies has a snap to be locked to the hole, thereby preventing the video unit from separating the electron gun. Preferably, the hole is of an elongated shape. Every rib has a hook at an end part, and the second clamp main body has a hook hole to which the hook is selectively locked. Thus, the second clamp main body is supported by the ribs.

Alternatively, the display apparatus can be constructed without the first clamp. In this case, the second clamp fastened to the video unit is directly mounted on the circumference of the neck and couple the electron gun with the video unit by tightening the second tightening member.

BRIEF DESCRIPTION OF THE DRAWINGS

A more complete appreciation and many of the attendant advantages of the invention will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A preferred embodiment of the present invention will be described in more detail with reference to the accompanying drawings.

Figure 1:
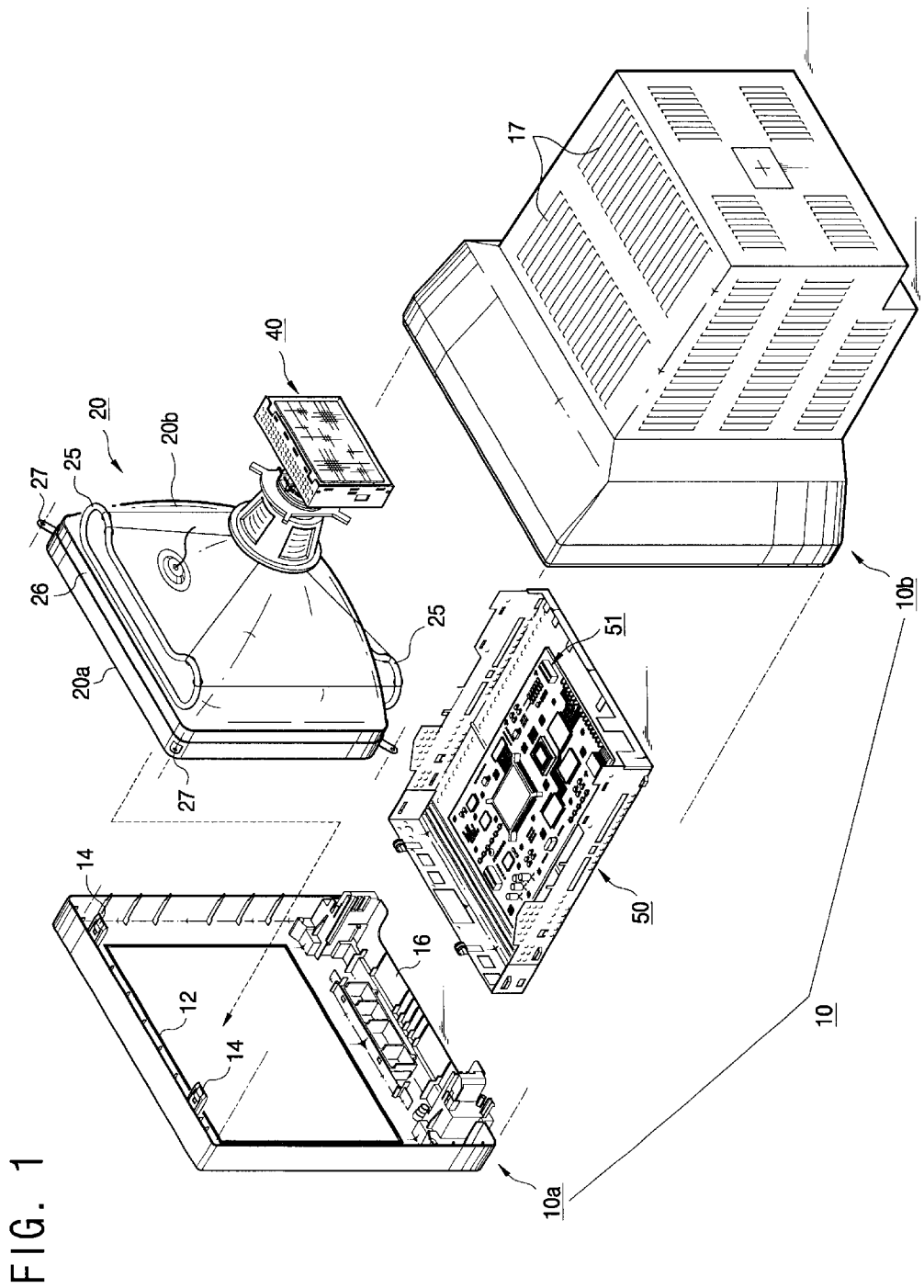
FIG. 1 is an exploded perspective view of a display apparatus according to the present invention.

As shown in FIG. 1, a display apparatus according to the present invention comprises a housing 10 forming an external appearance, a cathode ray tube 20 mounted on the housing 10, an electron gun 30 (see FIG. 2) emitting an electron beam into the cathode ray tube 20, a video unit 40 transmitting a video signal to the cathode ray tube 20, and a substrate frame 50 on which a main PCB (printed circuit board) 51 transmitting an electric signal to the cathode ray tube 20 is mounted.

The housing 10 includes a front housing 10a and a rear housing 10b which are combined each other surrounding the cathode ray tube 20. The front housing 10a has an opening 12 through which a picture is displayed on a panel 20a of the cathode ray tube 20. To attach the rear housing 10b to the front housing 10a, the front housing 10a has a plurality of snaps 14 protruding toward the rear housing 10b in an upper part of the front housing 10a. A supporter 16 is formed in a lower part of the front housing 10a and supports the cathode ray tube 20. A front side of the rear housing 10b has a plurality of snap holders (not shown) for holding the snaps 14 of the front housing 10a. On a surface of the rear housing 10b has a plurality of slots 17 for emitting heat generated from every component.

Figure 2:
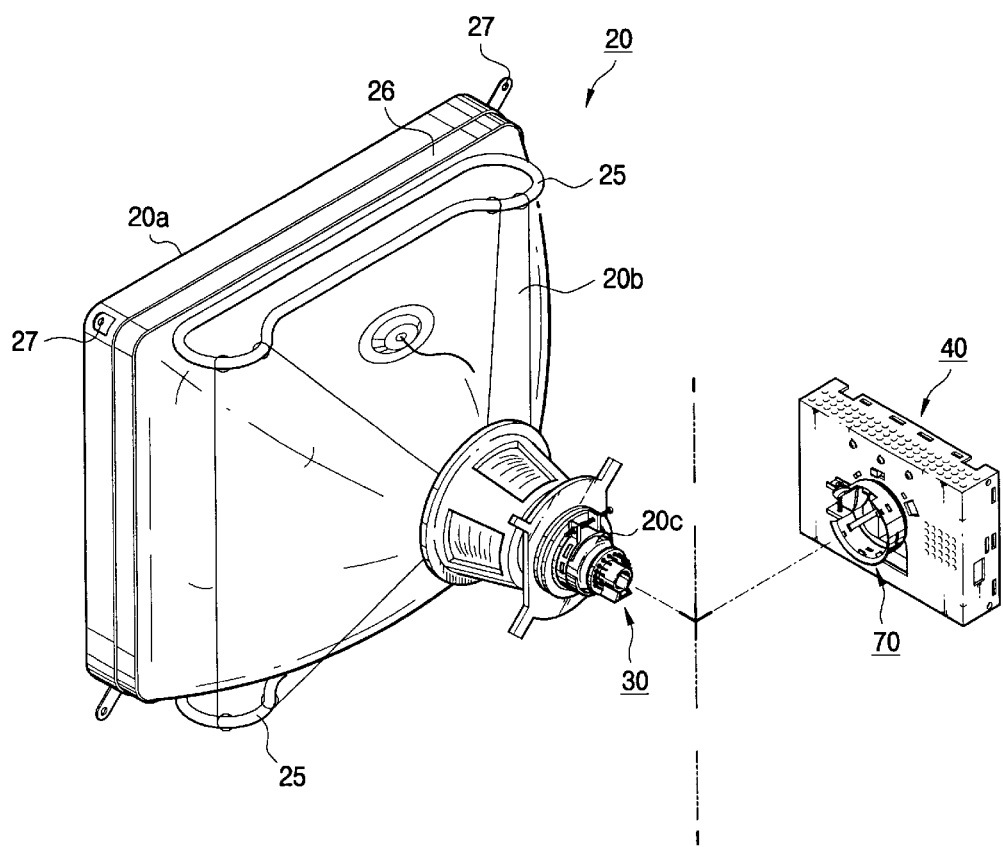
FIG. 2 is an enlarged perspective view of a part of the display apparatus of FIG. 1.

As shown in FIG. 2, the cathode ray tube 20 includes the panel 20a on which a picture is displayed, and a funnel 20b which is attached to the panel 20a. A degaussing coil 25 is mounted in the outside of the cathode ray tube 20 for blocking a magnetic field generated from internal components.

A band 26 which is preferably made of metal surrounds the outside edge of the cathode ray tube 20. Mounting ears 27 are mounted at every corner of the band 26. The mounting ear 27 has a screw hole for fastening the cathode ray tube 20 to a boss (not shown) protruding from the rear of the front housing 10a.

The electron gun 30 is coupled with a neck 20c of the cathode ray tube 20. The electron gun 30 emits an electron beam into the cathode ray tube 20 and the emitted electron beam collides with fluorescent materials of monochrome or RGB (red, green, blue) colors coated on an inner surface of the panel 20a, thereby displaying a picture on the panel 20a.

Figure 3:
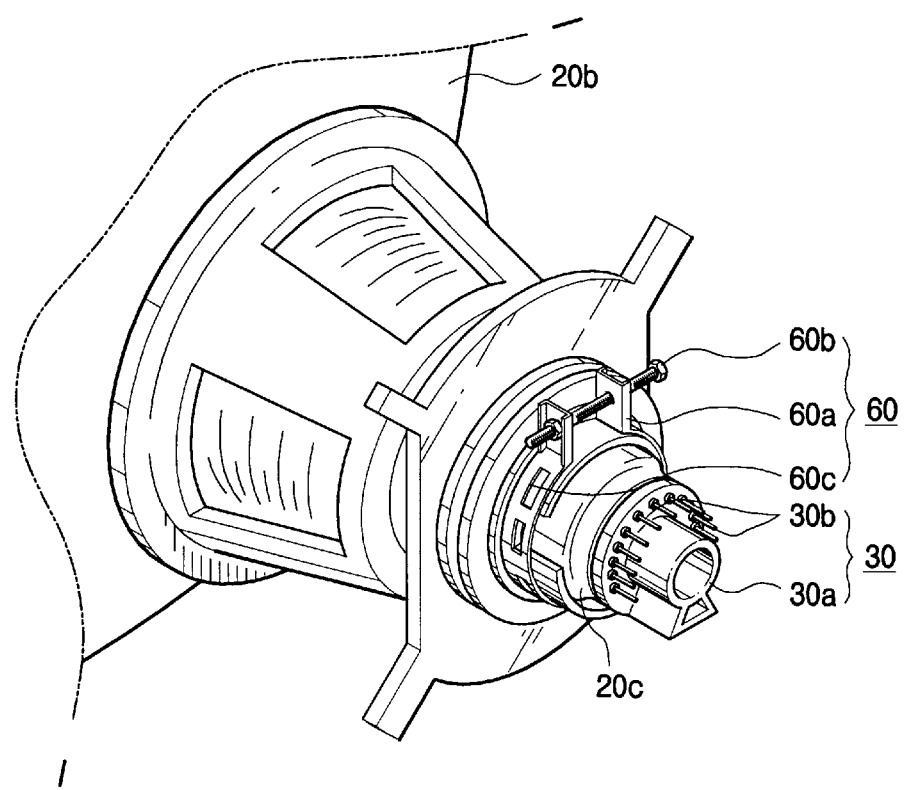
FIG. 3 is an enlarged perspective view of an electron gun of FIG. 2.
Figure 5:
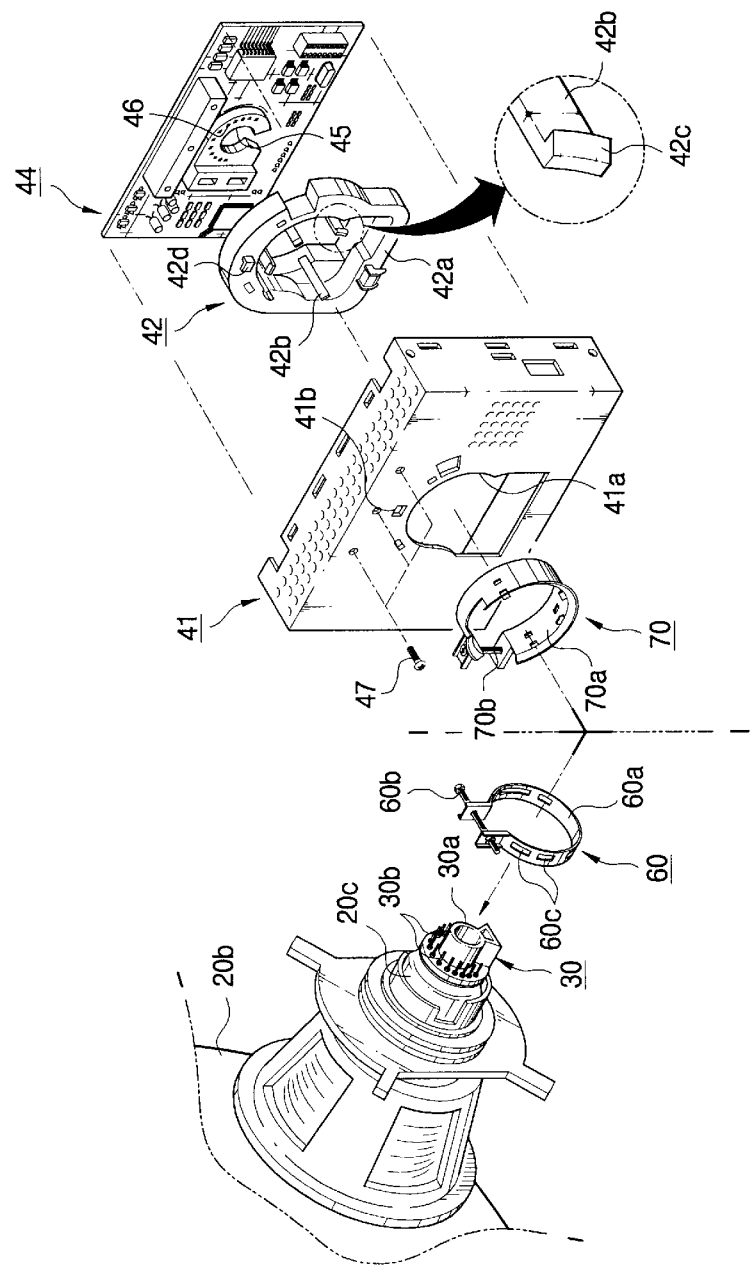
FIG. 5 is an exploded perspective view of the electron gun and the video unit.

As shown in FIGS. 3 and 5, the electron gun 30 includes an insertion portion (not shown) inserted into the neck 20c of the cathode ray tube 20, and a boss 30a protruding from a rear end of the insertion portion and protruding out of the neck 20c. The boss 30a has a non-circular section in order to prevent the video unit 40 from rotating when the boss 30a is engaged to a boss holder 45. A plurality of pins 30b are mounted around the boss 30a to be plugged in the pinholes 46 formed in the boss holder 45 for electric connection.

Figure 4:
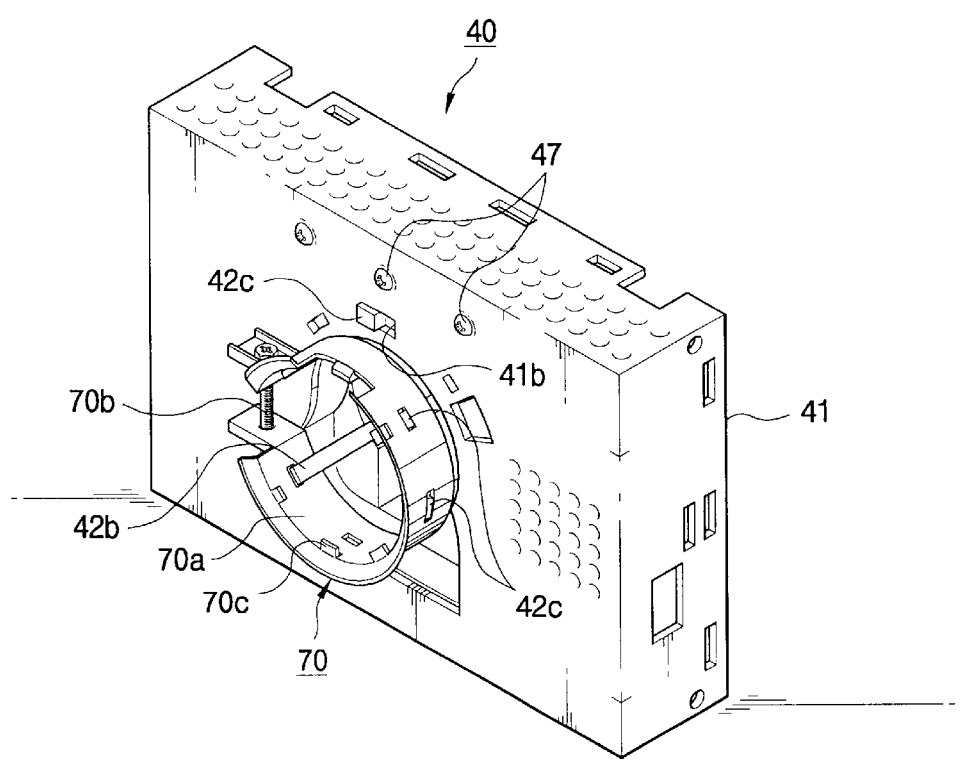
FIG. 4 is an enlarged perspective view of a video unit of FIG. 2.

As shown in FIGS. 4 and 5, the video unit 40 includes a shield 41 that is made of metal and forms an outer appearance of the video unit 40, a reinforcement member 42 fastened to the rear of the shield 41, and a video PCB 44 fastened to the rear of the shield 41 by means of bolts 47.

The shield 41 has a neck hole 41a in its center area and has a plurality of hook holes 41b around the neck hole 41a. The boss 30a of the electron gun 30 and a part of the neck 20c are inserted into the neck hole 41a. A plurality of clasps 42d of the reinforcement member 42 are inserted into the plurality of holes 41b.

The reinforcement member 42 has a main body 42a having an opening at its center, and a plurality of ribs 42b being exposed outside of the shield 41 via the neck hole 41a when the reinforcement member 42 is coupled with the shield 41. The ribs 42b are placed around the neck hole 41a and support a second clamp 70. The rib 42b has a hook 42c at its end. The hooks 42c are selectively engaged to a groove part 70d and hook holes 70e of the second clamp 70, respectively. Thus, the second clamp 70 is fastened to the shield 41 and the reinforcement member 42 by the ribs 42b.

The video PCB 44 has the boss holder 45 for receiving the boss 30a. The boss holder 45 has a shape corresponding to the boss 30a and has the pin holes 46 into which the pins 30b at the electron gun are inserted for electric connection.

A first clamp 60 and the second clamp 70 are coupled with the electron gun 30 and the video unit 40 respectively, and are coupled each other, thereby preventing the video unit 40 from separating from the electron gun 30.

Figure 6:
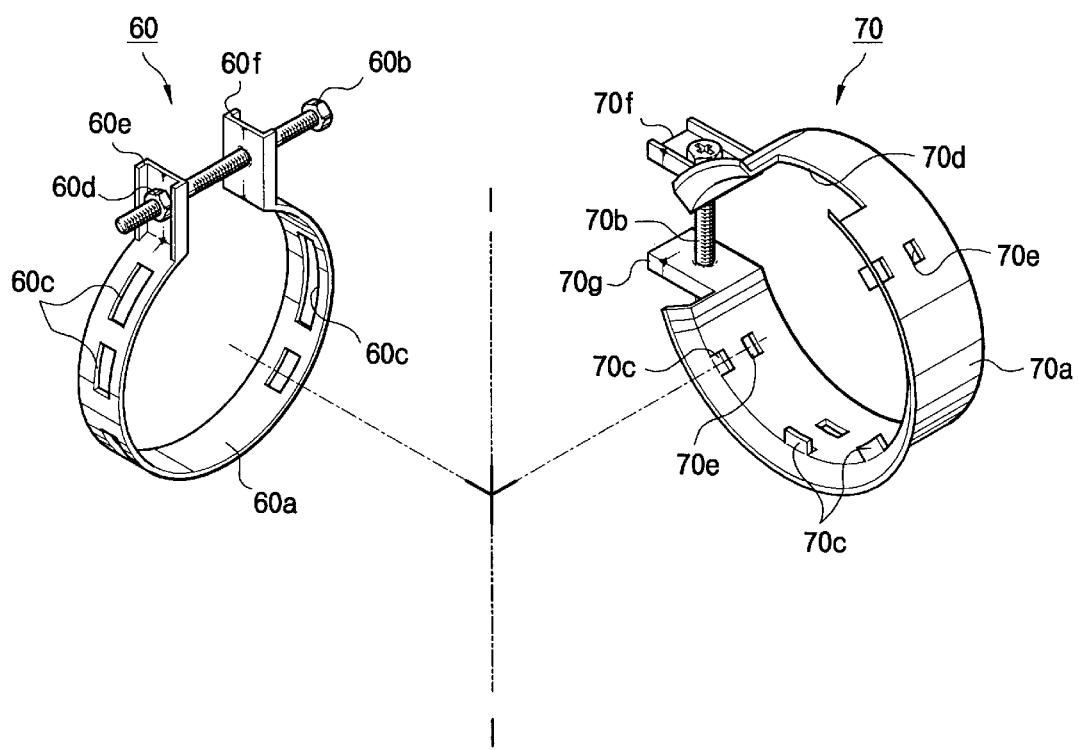
FIG. 6 is an enlarged perspective view of first and second clamps of FIG. 5.

As shown in FIG. 6, the first clamp 60 includes a ring-shaped first clamp main body 60a mounted on the neck 20c of the cathode ray tube 20, and first tightening members 60b and 60d making opposite ends 60e and 60f of the fist clamp main body 60a close to each other so as to fasten the first clamp main body 60a to the circumference of the neck 20c. The first clamp main body 60a has a plurality of holes 60c to which snaps 70c of a second clamp main body 70a are engaged. Each hole 60c is of an elongated hole shape, so that each snaps 70c is easily engaged to the hole 60c.

The second clamp 70 includes the second clamp main body 70a coupled with the plurality of ribs 42b of the video unit 40, and a second tightening member 70b making opposite ends 70f and 70g of the second clamp main body 70a close to each other, thereby keeping the snaps 70c of the second clamp 70 from being disengaged from the holes 60c of the first clamp 60 where the snaps 70c of the second clamp 70 are engaged to the holes 60c of the first clamp 60. The second claim main body 70a has the snaps 70c to be engaged to the holes 60c of the first clamp 60, and the groove part 70d and the hook holes 70e to be engaged to the hooks 42c at the end parts of the ribs 42b.

With this configuration, a process of combining the video unit 40 to the electron gun 30 will be described hereinbelow.

Firstly, the first clamp main body 60a of the first clamps 60 is placed on the circumference of the neck 20c, and then the opposite ends 60e and 60f of the first clamp main body 60a are approached each other by means of the tightening members 60b and 60d, thereby fastening the first clamp main body 60a on the circumference of the neck 20c.

Similarly, the second clamp main body 70a of the second clamp 70 is coupled to the ribs 42b of the video unit 40. That is, the hooks 42c at the end parts of the ribs 42b are engaged to the groove part 70d and the hook holes 70e, thereby engaging the second clamp 70 to the video unit 40.

Thereafter, the boss 30a of the electron gun 30 is inserted into the boss holder 45 of the video PCB 44 through the neck hole 41 a of the video unit 40. When the boss 30a is inserted into the boss holder 45, the pins 30b of the electron gun 30 are inserted into the pin holes 46 on the video PCB 44. Then, the snaps 70c at the second clamp main body 70a of the second clamp 70 coupled with the video unit 40 are inserted into the holes 60c at the first clamp main body 60a of the first clamp 60 coupled with the electron gun 30. After the snaps 70c are inserted into the holes 60c, the second tightening member 70b is tightened so as to make the opposite ends 70f and 70g of the second clamp main body 70a close to each other, thereby keeping the snaps 70c from coming out of the holes 60c. Thus, the combination of the electron gun 30 and the video unit 40 is finished.

Alternatively, the display apparatus can be constructed without the first clamp 60. In this case, the second clamp 70 fastened to the video unit is directly mounted on the circumference of the neck 20c and couples the electron gun 30 with the video unit 40 by tightening the second tightening member 70b.

As described above, according to the present invention, at the electron gun 30 and the video unit 40 are respectively coupled with the first and second clamps 60 and 70, thereby not only preventing the video unit 40 from separating from the electron gun 30 but also easily coupling the video unit 40 with the electron gun 30. Moreover, the electron gun 30 and the video unit 40 are coupled together by the combination of the first and second clamps 60 and 70, thereby preventing the neck 20c of the cathode ray tube 20 from being broken. Thus, a display apparatus according to the present invention cannot only easily couple a video unit with an electron gun but also prevent the video unit from separating from the electron gun. Moreover, breaking of a neck of a cathode ray tube can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus, comprising:
   a panel displaying a picture;
   a funnel fastened to the panel, said funnel having a neck;
   an electron gun inserted into the neck;
   a video unit transmitting a video signal;
   a first clamp coupled to said electron gun; and
   a second clamp coupled to said video unit, said first and second clamps coupled together, whereby said electron gun is coupled to said video unit.

2. The display apparatus according to claim 1, further comprised of:
   said first clamp comprising a first clamp main body and a first tightening member, said first clamp main body mounted on a circumference of the neck, said first tightening member making opposite ends of the first clamp main body close to each other to fasten the first clamp main body to the circumference of the neck; and
   said second clamp comprising a second clamp main body and a second tightening member, said second clamp main body coupled to said video unit, said second tightening member making opposite ends of the second clamp main body close to each other to fasten the second clamp main body to the first clamp main body.

3. The display apparatus according to claim 2, further comprised of:
   said electron gun having a boss protruding from said electron gun and being exposed out of said neck; and
   said video unit having a boss holder, said boss inserted into said boss holder.

4. The display apparatus according to claim 3, further comprised of:
   said video unit comprising a first rib toward said electron gun, each of said first rib having a first hook at an end of said first rib; and
   said second clamp main body having a first hole receiving said first hook.

5. The display apparatus according to claim 4, further comprised of:
   said video unit comprising a second rib, said second rib having a second hook at an end of the second rib; and
   said second clamp main body having a groove receiving a said second hook.

6. The display apparatus according to claim 5, wherein one of the first and second clamp main bodies has a second hole, and the other of the first and second clamp main bodies has a snap inserted into the second hole.

7. The display apparatus according to claim 6, said second hole having an elongated shape.

8. The display apparatus, comprising:
   a panel displaying a picture;
   a funnel fastened to the panel, said funnel having a neck;
   an electron gun inserted into the neck, said electron gun having a boss protruding from said electron gun and being exposed out of said neck;
   a video unit transmitting a video signal, said video unit comprising a shield having a first opening, a reinforcement member having a second opening and a plurality of first ribs toward the electron gun, and a circuit board having a boss holder, said boss inserted into said boss holder through said first and second openings;
   a first clamp coupled to said electron gun; and
   a second clamp held by said plurality of first ribs and coupled to said video unit, said first and second clamps coupled together, whereby said electron gun is coupled to said video unit.

9. The display apparatus according to claim 8, said boss and said boss holder having a non-circular section.

10. The display apparatus according to claim 9, further comprised of:
    said electron gun having pins around said boss; and
    said circuit board having third holes receiving said pins.

11. The display apparatus according to claim 9, further comprised of:
    said first clamp comprising a first clamp main body mounted on a circumference of the neck, a first tightening member making opposite ends of the fist clamp main body close to each other to fasten the first clamp main body to the circumference of the neck; and
    said second clamp comprising a second clamp main body held by the plurality of first ribs and a second tightening member making opposite ends of the second clamp main body close to each other to fasten the second clamp main body to the first clamp main body.

12. The display apparatus according to claim 11, further comprised of:
    each of said plurality of first ribs having a first hook at an end of said first rib; and
    said second clamp main body having a plurality of first holes receiving said first hooks.

13. The display apparatus according to claim 12, further comprised of:
    said video unit comprising a second rib, said second rib having a second hook at an end of the second rib; and
    said second clamp main body having a groove receiving a said second hook.

14. The display apparatus according to claim 13, wherein one of the first and second clamp main bodies has a second hole, and the other of the first and second clamp main bodies has a snap inserted into the second hole.

15. The display apparatus according to claim 14, said second hole having an elongated shape.

16. The display apparatus according to claim 8, further comprised of:
    said reinforcement having a clasp; and
    said shield having a fourth hole receiving said clasp.

17. A display apparatus, comprising:
    a panel displaying a picture;
    a funnel fastened to the panel, said funnel having a neck;

an electron gun inserted into the neck, said electron gun having a boss protruding from said electron gun and being exposed out of said neck;

a video unit transmitting a video signal, said video unit having a shield having a first opening, a reinforcement member having a second opening in the center of the reinforcement and a first rib, and a circuit board having a boss holder, said boss inserted into said boss holder through said first and second openings; and a clamp held by said first rib and coupled to said electron gun, said clamp having a clamp main body and a tightening member, said clamp main body held by said first rib and mounted on a circumference of the neck, said tightening member making opposite ends of the clamp main body close to each other to fasten the clamp main body to the circumference of the neck.

18. The display apparatus according to claim 17, further comprised of:

said first rib having a first hook at an end of said first rib; and said clamp main body having a first hole receiving said first hook.

19. The display apparatus according to 18, further comprised of:

said video unit comprising a second rib, said second rib having a second hook at an end of the second rib; and said clamp main body having a groove receiving a said second hook.

20. The display apparatus according to claim 17, further comprised of:

said reinforcement having a clasp; and said shield having a fourth hole receiving said clasp.

21. The display apparatus according to 17, said boss and said boss holder having a noncircular section.

22. The display apparatus according to 17, further comprised of:

said electron gun having pins around said boss; and said circuit board having third holes receiving said pins.

* * * * *